(12) United States Patent
Carsac et al.

(10) Patent No.: US 7,341,449 B2
(45) Date of Patent: Mar. 11, 2008

(54) PROCESS FOR THE HEAT TREATMENT OF A SERIES OF OBJECTS AND ASSOCIATED APPARATUS

(75) Inventors: Claude Carsac, Limours (FR); Joseph Paganessi, Burr Ridge, IL (US); Jérôme Perrin, Paris (FR); Patrick Kae-Nune, Paris (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 368 days.

(21) Appl. No.: 10/961,170

(22) Filed: Oct. 8, 2004

(65) Prior Publication Data

US 2005/0100849 A1    May 12, 2005

(30) Foreign Application Priority Data

Oct. 9, 2003    (FR) .................................. 03 50664

(51) Int. Cl.
*F27B 9/20*    (2006.01)

(52) U.S. Cl. ...................................... 432/121; 432/136
(58) Field of Classification Search .................. 432/64, 432/121, 136, 152
See application file for complete search history.

(56) References Cited

U.S. PATENT DOCUMENTS

| | | | |
|---|---|---|---|
| 4,551,091 A | | 11/1985 | Paterson |
| 4,894,009 A | | 1/1990 | Kramer et al. |
| 4,915,622 A | * | 4/1990 | Witmer ........................ 432/64 |
| 5,172,848 A | * | 12/1992 | Barten et al. .................. 228/18 |
| 5,338,008 A | * | 8/1994 | Okuno et al. ................ 266/105 |
| 5,358,167 A | * | 10/1994 | Tachibana et al. ............. 228/42 |
| 6,780,225 B2 | * | 8/2004 | Shaw et al. .................... 95/273 |
| 2002/0061490 A1 | * | 5/2002 | Yamaoka et al. ............ 432/152 |

FOREIGN PATENT DOCUMENTS

| | | |
|---|---|---|
| DE | 42 19 913 A1 | 12/1993 |
| DE | 42 42 823 A1 | 6/1996 |
| EP | 0 319 948 A2 | 6/1989 |
| WO | WO 91 11284 | 8/1991 |

OTHER PUBLICATIONS

WO 91/11284.*
French Search Report FR 03 50664.

* cited by examiner

*Primary Examiner*—Gregory Wilson
(74) *Attorney, Agent, or Firm*—Christopher J. Cronin

(57) ABSTRACT

A method and apparatus for heat treating objects in an enclosure, where the enclosure has an inlet passage, an outlet passage, and a treatment zone. Gaseous first fluid is injected into the treatment zone and the objects to be treated are passed through the treatment zone. A second fluid, with a density greater than that of the first fluid, is injected near the inlet and outlet passages.

8 Claims, 2 Drawing Sheets

PROCESS FOR THE HEAT TREATMENT OF A SERIES OF OBJECTS AND ASSOCIATED APPARATUS

BACKGROUND

The present invention relates to a process for the heat treatment of a series of objects in an enclosure, situated in a surrounding gaseous fluid, particularly air, and defining an internal treatment zone, the said enclosure comprising at least one entrance passage and at least one exit passage, the said passages being provided between the treatment zone and the exterior of the enclosure; the process being of the type that comprises the following steps:

(a) the treatment zone is heated;
(b) a gaseous treatment fluid is injected into the treatment zone;
(c) the said objects are transported through the said treatment zone; and
(d) a gaseous isolating fluid is injected in the vicinity of at least one of the said passages.

This process applies to the assembling of electronic boards by soldering.

In a process of the abovementioned type (WO 91/11284), components to be assembled are placed on a board in areas covered with a solder cream. The board is then introduced into a oven where it undergoes a thermal cycle which carries out the soldering.

To improve the quality of this soldering and in particular avoid defects on boards of complex structure caused by the small size of the components, a stream of inerting nitrogen is injected into the oven. The oxygen concentration in the oven is thus brought down below a limit value of a few hundred ppm (parts per million). This operation, which can be described as "inerting", under a nitrogen atmosphere, prevents in particular oxidation of the parts to be soldered during the heating.

Such processes are not completely satisfactory. Specifically, in order to keep the oxygen content below a few hundred ppm in the oven, and thereby maintain the quality of the soldering, a high nitrogen flow rate is required (some 20 to 40 m³/h)

SUMMARY

The main object of the invention is to solve this problem, that is to create a heat treatment process that performs a high quality treatment at low cost.

To this end, the subject of the invention is a process of the abovementioned type, characterized in that, in step (d), the density of the said gaseous isolating fluid at the temperature found in the one or more of the said passages is greater than the density of the gaseous treatment fluid inside the oven, more particularly in the vicinity of the one or more of the said passages.

The process according to the invention may comprise one or more of the following features, taken in isolation or in all technically possible combinations:

- the density of the said gaseous isolating fluid at the temperature found in the one or more of the said passages is approximately equal to the density of the surrounding gaseous fluid at the temperature found outside the enclosure.
- the density of the said isolating gaseous fluid at the temperature found in the one or more of the said passages is greater than the density of the surrounding gaseous fluid at the temperature found outside the enclosure.
- in step (d), the density of the gaseous isolating fluid is controlled as a function of the temperature found at at least one point in the enclosure.
- in step (d), the said density is controlled by producing the isolating fluid from at least two sources of auxiliary gaseous fluid, the density of at least one of the auxiliary gaseous fluids, measured at a given temperature, being greater than the density of the gaseous treatment fluid measured at the said given temperature.

The present invention also relates to an apparatus for the heat treatment of objects, of the type that comprises:

- an enclosure, intended to be located in a surrounding gaseous fluid, particularly air, and defining an internal treatment zone; the said enclosure comprising at least one entrance passage and at least one exit passage, the said passages being provided between the treatment zone and the exterior of the enclosure;
- means for heating all or part of the treatment zone;
- means for transporting the said objects through the said treatment zone;
- means for injecting a gaseous treatment fluid into the treatment zone; and
- means for injecting a gaseous isolating fluid into at least one of the said passages;
- which is characterized in that the said means for injecting a gaseous isolating fluid comprise a source of gaseous isolating fluid whose density at the temperature found in the one or more of the said passages is greater than the density of the gaseous treatment fluid inside the oven, in the vicinity of the one or more of the said passages.

The apparatus according to the invention may also include one or more of the following features:

- the density of the gaseous isolating fluid at the temperature found in the one or more of the said passages is approximately equal to the density of the surrounding gaseous fluid at the temperature found outside the enclosure.
- the density of the said gaseous isolating fluid at the temperature found in the one or more of the said passages is greater than the density of the surrounding gaseous fluid at the temperature found outside the enclosure.
- it also includes means for controlling the density of the gaseous isolating fluid, operated by means for measuring the temperature found at at least one point in the enclosure.
- the control means comprise means of injecting at least one auxiliary gaseous fluid.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
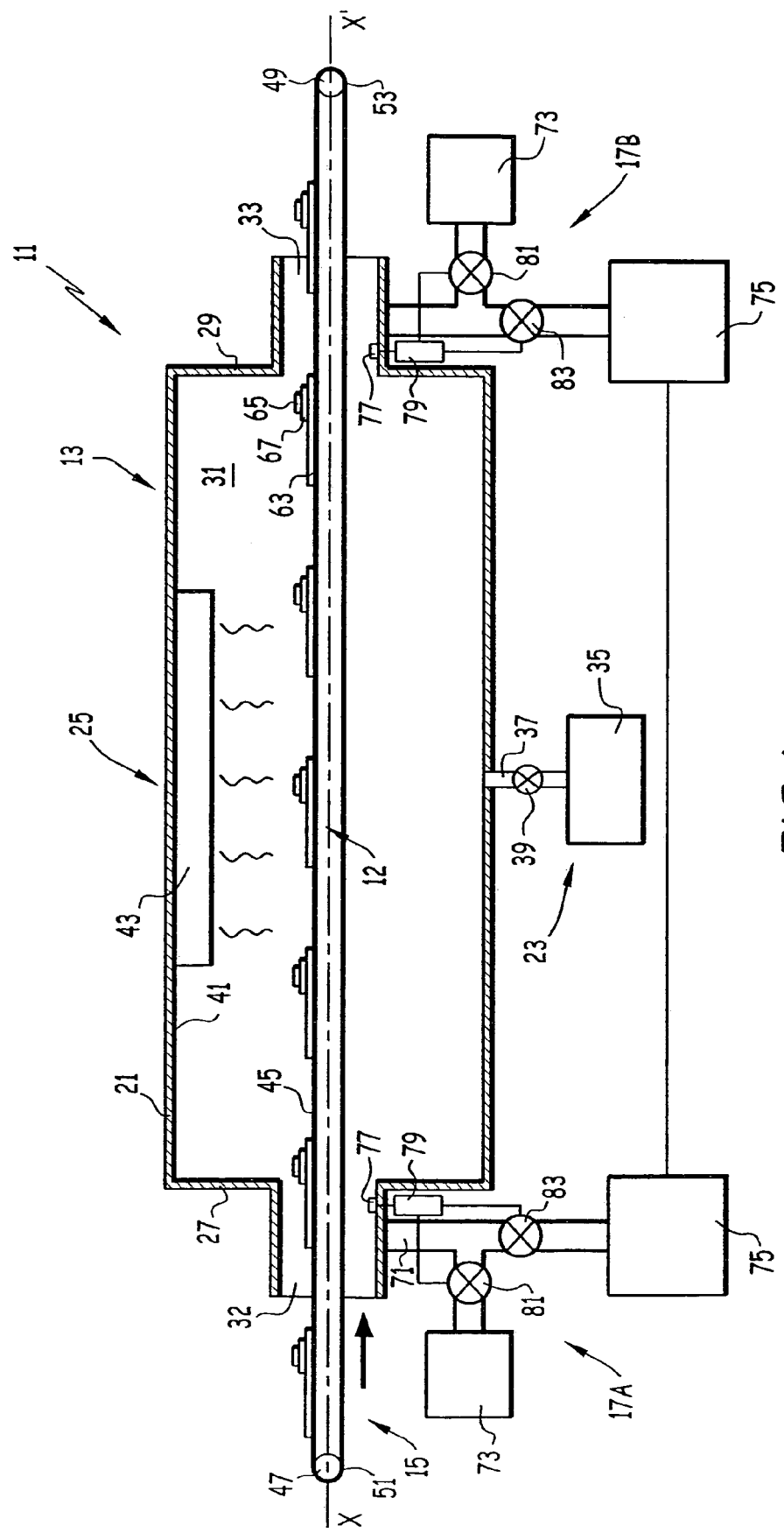
FIG. 1 illustrates a schematic, mid-plane sectional view of one embodiment of an apparatus according to the present invention.
Figure 2:
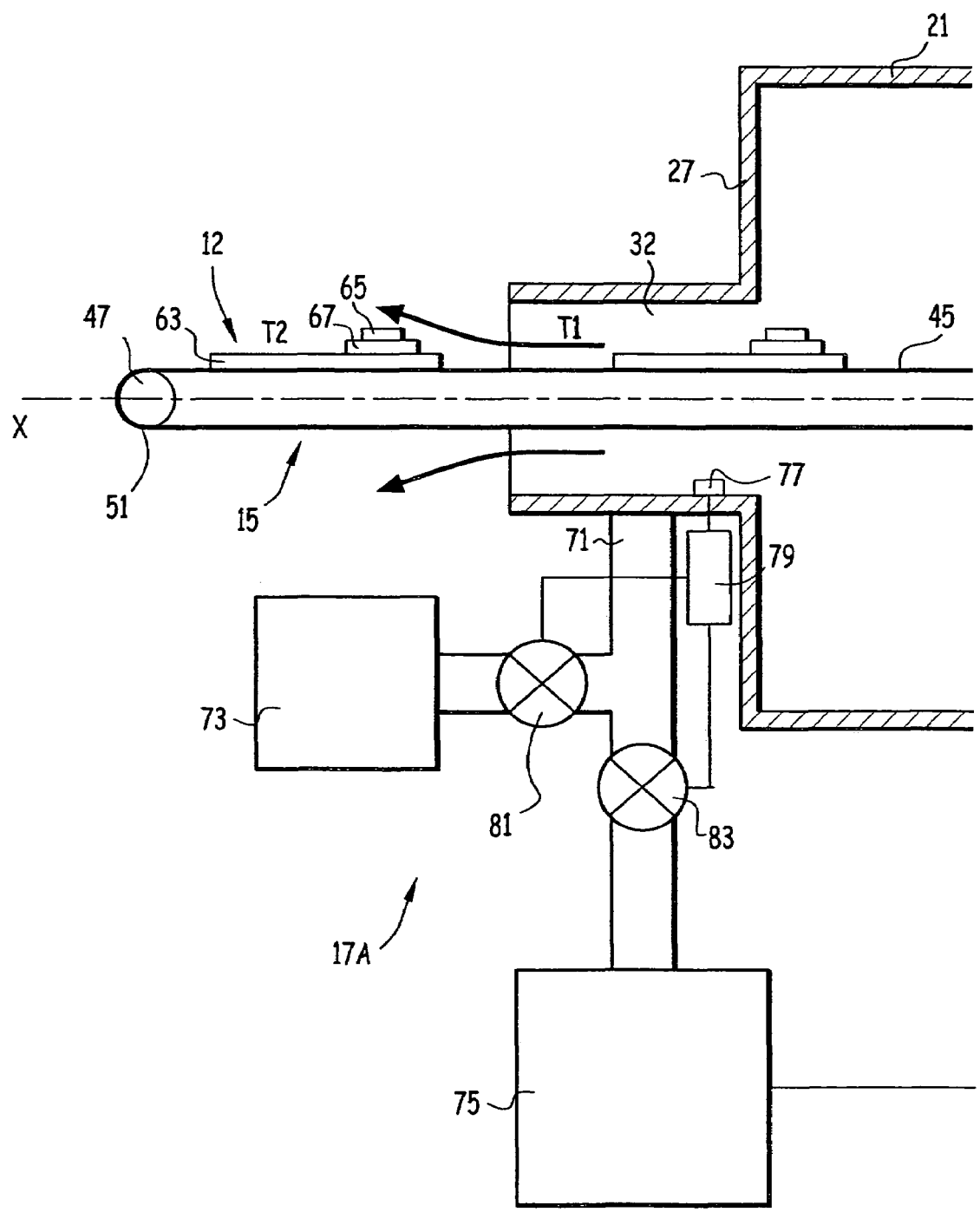
FIG. 2 illustrates a detail view of FIG. 1.

The heat-treatment apparatus 11 illustrated in FIGS. 1 and 2 is designed for assembling electronic boards 12 in a continuous reflow soldering process.

This apparatus 11 comprises a soldering oven 13, a conveyor 15, and gaseous barriers 17A and 17B located at the entrance and exit, respectively, of the soldering oven 13.

Throughout the remainder of this text, the terms "upstream", "downstream" and "upper" refer to the direction of movement of the electronic boards 12 on the conveyor 15 (from left to right in FIG. 1).

The soldering oven 13 comprises an enclosure 21 and, arranged inside the enclosure 21, a treatment gas injector 23 and heating means 25.

The enclosure 21 extends along a first longitudinal axis X-X' between an upstream end 27 and a downstream end 29. The walls of this enclosure 21 define an internal heat-treatment zone 31.

Upstream and downstream passages 32 and 33 are provided within the enclosure 21 at the upstream and downstream ends 27 and 29, respectively, of the enclosure 21. These passages 32 and 33 connect the exterior of the enclosure 21 to the treatment zone 31.

The enclosure 21 is situated in a surrounding gas comprising at least one oxidizing gas, particularly oxygen. In the example which follows, the surrounding gas is air at room temperature.

The treatment gas injector 23 feeds into the enclosure 21. This injector 23 comprises a source 35 of treatment gas (in the present case an inerting gas) and a pipe 37 which admits this gas into the treatment zone 31 and has a valve 39.

The treatment gas contained in the source 35 may be, by way of illustration, nitrogen, helium, hydrogen, argon, carbon dioxide or mixtures of these. According to the invention, helium-based mixtures that have a higher coefficient of thermal conductivity than air or nitrogen are of more particular interest.

By injecting the inerting gas into the enclosure 21, the oxygen concentration within the treatment zone 31 can be kept at a value below a few hundred ppm.

The heating means 25 are mounted in a stationary position on an upper wall 41 of the enclosure 21, in the treatment zone 31, facing the conveyor 15. In the present case, they comprise at least one convective heating member 43.

The conveyor 15 comprises a transport belt 45 that passes longitudinally through the enclosure 21 along the axis X-X', and extends between an upstream end 47 and a downstream end 49. The upstream and downstream ends 47 and 49 of the belt 45 project out of the enclosure 21 to allow the electronic boards 12 to be loaded and unloaded.

At its ends 47 and 49, the belt 45 passes around drive rollers 51 and 53. It is thus able to move translationally along the axis X-X' from upstream to downstream.

The boards 12 are placed on the belt 45 at regular intervals between its upstream end 47 and its downstream end 49.

Each board 12 comprises a support 63 and a component 65 that is to be mounted on this support, resting on a layer 67 of solder paste applied to the support 63.

The upstream and downstream gaseous barriers 17A and 17B are located at the respective upstream and downstream ends 27 and 29 of the enclosure 21.

The upstream barrier 17A and the downstream barrier 17B are analogous in structure. Only the upstream barrier 17A will therefore be described below.

The upstream barrier 17A comprises an injector 71 connected to two gas sources 73 and 75, a temperature probe 77, and control means 79.

The injector 71 comprises an admission pipe that feeds into the upstream passage 32 of the enclosure 21. The admission pipe is also connected to gas sources 73 and 75.

In the embodiment illustrated here, the first gas source 73 contains a gas whose density at a given temperature is less than or equal to the density of air, at this given temperature. The second gas source 75 contains a gas whose density, at a given temperature, is greater than the density of air at this given temperature.

The gas contained in the first source 73 is preferably nitrogen. Examples of gases contained in the second source 75 are carbon dioxide and argon.

Each gas source 73, 75 is connected to the injector 71 by a pipe equipped with a control valve 81, 83 for controlling the flow rate and composition of the isolating gas delivered to the injector 71, and so controlling the density of this isolating gas.

The temperature probe 77 is positioned in the upstream passage 32, in the vicinity of the injector 71 outlet.

The control valves 81 and 83 and the temperature probe 77 are connected electrically to the control means 79, so that the flow rate and composition of the isolating gas delivered by the gaseous barrier is controlled as a function of the temperature measured by the probe 77.

Of course, although the illustration here is of a structure for injecting isolating gas into the entrance/exit passages arriving through the bottom only of the passages, other arrangements are possible and often practised including overhead injection, or injection into both the top and bottom of each passage.

An example showing the operation of the apparatus 11 according to the invention during an electronic board 12 assembly operation will now be described below.

The heating means 25 are first activated in order to establish a soldering temperature in the treatment zone 31.

In addition, the treatment (inerting) gas is injected into the oven through the injector 23 in order to reduce oxygen levels in the enclosure 21 to less than a few hundred ppm.

As the temperature in the enclosure 21 rises, or once the temperature in the enclosure 21 is stabilized, the upstream and downstream gaseous barriers 17A and 17B are activated.

The operation of the upstream barrier 17A will now be described. The operation of the downstream barrier 17B is analogous to the operation of the upstream barrier 17A.

The temperature at the upstream end 27 of the inerting zone 31 is measured by the probe 77. Each of the control valves 81 and 83 is actuated by the control means 79. The composition of the isolating gas injected by the injector 71 of the upstream barrier 17A is thus controlled in such a way that this gas possesses a density, at the temperature found in the upstream passage 32 of the enclosure 21, it is approximately equal to the density of air at room temperature on the outside of the soldering oven 13.

The conveyor 15 is then started up and boards 12 are deposited at regular intervals on the belt 45.

As illustrated in FIG. 2, the densities of the isolating gas in the upstream barrier 17A and of the surrounding gas on the outside of this barrier 17A are approximately equal, so the displacement of the gaseous fluid from the barrier 17A in the outward direction is approximately laminar and parallel to the horizontal axis X-X'.

This movement ensures that air does not enter the enclosure 21, as would occur if the relatively hotter isolating gas passing out of the barrier 17A were less dense than the air at room temperature, particularly when a board 12 enters the enclosure 21.

Subsequently, the flow rate of isolating gas injected into the upstream barrier 17A may be appreciably reduced.

The boards 12 are then conveyed towards the downstream end 29 of the enclosure 21 and undergo heat treatment as they pass the heating means 25.

The boards 12 then pass through the downstream barrier 17B and are unloaded from the belt 45 after cooling.

As stated earlier, the operation of the downstream barrier 17B is analogous to that of the upstream barrier 17A.

Similarly, the composition of the isolating gas delivered by the downstream barrier 17B is controlled in such a way that this gas has a density, at the temperature found in the downstream passage 33, that is approximately equal to the density of the air at room temperature on the outside of the soldering oven 13.

Similarly according to the invention, the composition of the isolating gas delivered by the upstream and downstream barriers is so controlled that this gas has a density, at the temperature found in the passages, that is greater than the density of the inerting gas at the upstream or downstream end 27 or 29 of the enclosure 21, at the temperature found at this end 27 or 29.

As an illustration, the gases used in the different zones of the installation are as follows:

for the inerting gas: thermally advantageous mixtures such as helium or helium-based mixtures, mixtures containing hydrogen such as nitrogen/hydrogen mixtures;

for the isolating gas: higher-density gases or mixtures such as $CO_2$, $CO_2$-based mixtures such as He—$CO_2$, $N_2$—$CO_2$, Ar—$CO_2$, etc.

The invention described above gives access to a very economical high-quality heat treatment process. In particular, the process considerably limits the wastage and therefore the consumption of inerting gas, which is particularly advantageous, not to say necessary, where using thermally advantageous but expensive inerting gases.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method which may be used for heat treating objects in an enclosure, said method comprising:
   a) heating at least one zone of said enclosure, wherein said enclosure comprises:
      1) a treatment zone; and
      2) passages, wherein said passages comprise:
         i) at least one entrance passage located between said treatment zone and the exterior of said enclosure; and
         ii) at least one exit passage located between said treatment zone and said exterior of said enclosure;
   b) injecting a gaseous first fluid into said treatment zone;
   c) transporting said objects through said treatment zone; and
   d) injecting a gaseous second fluid near said passages, said second gaseous fluid comprising a mixture of at least two gases, wherein:
      1) at a first temperature present in said passages, the density of said second fluid is greater than the density of said first fluid,
      2) air surrounds said enclosure and is at a second temperature less than said first temperature, and
      3) the density of said second fluid at the first temperature is approximately equal to or greater than a density of air surrounding said enclosure at said second temperature.

2. The method of claim 1, wherein the density of said second fluid, at said second temperature, is approximately equal to the density of said air surrounding said enclosure at said second temperature.

3. The method of claim 1, wherein the density of said second fluid, at said first temperature, is greater than the density of said air surrounding said enclosure at said second temperature.

4. A method which may be used for heat treating objects in an enclosure, said method comprising:
   a) heating at least one zone of said enclosure, wherein said enclosure comprises:
      1) a treatment zone; and
      2) passages, wherein said passages comprise:
         i) at least one entrance passage located between said treatment zone and the exterior of said enclosure; and
         ii) at least one exit passage located between said treatment zone and said exterior of said enclosure;
   b) injecting a gaseous first fluid into said treatment zone;
   c) transporting said objects through said treatment zone;
   d) injecting a gaseous second fluid near said passages, wherein at a temperature present in said passages, the density of said second fluid is greater than the density of said first fluid; and
   e) controlling the density of said second fluid as a function of at least one temperature present in said enclosure.

5. The method of claim 4, further comprising producing said second fluid from at least two sources of auxiliary gaseous fluid, wherein the density of at least one said auxiliary fluid, as measured at a given temperature, is greater than the density of said first fluid, as measured at said given temperature.

6. A system which may be used for the heat treatment of a series of objects, said apparatus comprising:
   a) an enclosure located in a gaseous third fluid, wherein said enclosure comprises:
      1) an internal treatment zone; and
      2) passages, wherein said passages comprise:
         i) at least one entrance passage located between said treatment zone and the exterior of said enclosure; and
         ii) at least one exit passage located between said treatment zone and said exterior of said enclosure;
   b) a means for heating at least part of said treatment zone;
   c) a means for transporting said objects through said treatment zone;
   d) a means for injecting a gaseous first fluid into said treatment zone; and
   e) a means for injecting a gaseous second fluid into at least one said passage, wherein:
      1) said second fluid injecting means comprises a source of said gaseous second fluid, and
      2) said gaseous second fluid comprises one of carbon dioxide, a mixture of carbon dioxide and helium, a mixture of carbon dioxide and nitrogen, and a mixture of carbon dioxide and argon.

7. An apparatus which may be used for the heat treatment of a series of objects, said apparatus comprising:
   a) an enclosure located in a gaseous third fluid, wherein said enclosure comprises:
      1) an internal treatment zone; and
      2) passages, wherein said passages comprise:
         i) at least one entrance passage located between said treatment zone and the exterior of said enclosure; and
         ii) at least one exit passage located between said treatment zone and said exterior of said enclosure;
   b) a means for heating at least part of said treatment zone;
   c) a means for transporting said objects through said treatment zone;
   d) a means for injecting a gaseous first fluid into said treatment zone;
   e) a means for injecting a gaseous second fluid into at least one said passage, wherein said second fluid injecting means comprises a source of said gaseous second fluid whose density, as measured at a temperature present in said passages, is greater than the density of said first fluid located near said passages; and
   f) a means for controlling the density of said second fluid, wherein said controlling means comprises a means for measuring at least one temperature present in said enclosure.

8. The apparatus of claim 7, wherein said control means comprises a means for injecting at least one auxiliary gaseous fluid.

* * * * *